United States Patent
Karri et al.

(10) Patent No.: US 11,481,211 B1
(45) Date of Patent: Oct. 25, 2022

(54) DYNAMICALLY CREATING SOURCE CODE COMMENTS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Akash U. Dhoot, Pune (IN); Kamal Somani, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/495,270

(22) Filed: Oct. 6, 2021

(51) Int. Cl.
  *G06F 8/73* (2018.01)
  *G06F 8/10* (2018.01)

(52) U.S. Cl.
  CPC . *G06F 8/73* (2013.01); *G06F 8/10* (2013.01)

(58) Field of Classification Search
  CPC .............. G06F 8/10; G06F 8/73; G06N 20/00
  See application file for complete search history.

(56) References Cited

U.S. PATENT DOCUMENTS

| | | |
|---|---|---|
| 8,756,568 B2 | 6/2014 | Hale |
| 9,563,408 B1 | 2/2017 | Bartlett |
| 9,940,104 B2 | 4/2018 | Vann |
| 10,169,036 B2 | 1/2019 | Frenkiel |
| 10,180,836 B1 | 1/2019 | Arguelles |
| 10,318,286 B2 | 6/2019 | Velusamy |
| 10,437,588 B1* | 10/2019 | Crawford .............. H04L 9/3247 |
| 10,817,604 B1* | 10/2020 | Kimball .................... G06F 8/73 |
| 10,846,082 B2 | 11/2020 | Fan |
| 2012/0036492 A1* | 2/2012 | Armstrong ................ G06F 8/30 717/100 |
| 2016/0103679 A1 | 4/2016 | Wolfram |
| 2016/0202971 A1 | 7/2016 | Frenkiel |
| 2016/0266896 A1* | 9/2016 | Fan ......................... G06F 11/36 |
| 2020/0301673 A1* | 9/2020 | Welp ........................ G06F 8/10 |

(Continued)

FOREIGN PATENT DOCUMENTS

WO   2019223804 A1   11/2019

OTHER PUBLICATIONS

Jacob Krüuger et al., "Effects of Explicit Feature Traceability on Program Comprehension", [Online], pp. 338-349, [Retrieved from Internet on Aug. 27, 2022], <https://dl.acm.org/doi/pdf/10.1145/3338906.3338968> (Year: 2019).*

(Continued)

*Primary Examiner* — Ziaul A Chowdhury
(74) *Attorney, Agent, or Firm* — Gilbert Harmon, Jr.

(57) ABSTRACT

An approach for dynamically generating comments associated with software source code. The identifies a user accessing the software source code. The approach retrieves data associated with the software source code, e.g., server logs, requirements documents, etc. The approach identifies skills associated with the user. The approach, using artificial intelligence (AI), predicts the reason the user is accessing the software source code. The approach identifies navigation patterns based on the user access. The approach, using AI, dynamically generates comments for the user. The approach overlays the comments on the software sour code under review and displays the combination to the user.

20 Claims, 6 Drawing Sheets

(56) References Cited

U.S. PATENT DOCUMENTS

2021/0011712 A1\* 1/2021 Grant .................. G06F 11/3616
2021/0117184 A1\* 4/2021 De Capoa ................. G06F 8/72

OTHER PUBLICATIONS

Christopher S. Corley et al., "Changeset-Based Topic Modeling of Software Repositories", [Online], pp. 1068-1080, [Retrieved from interneton Aug. 27, 2022], <https://ieeexplore.ieee.org/stamp/stamp.jsp?arnumber=8486696> (Year: 2018).\*

Giriprasad Sridhara et al., "Naturalness of Natural Language Artifacts in Software", [Online], pp. 156-165, [Retrieved from Internet on Aug. 27, 2022], <https://dl.acm.org/doi/pdf/10.1145/2723742.2723758> (Year: 2015).\*

Liang et al., "Automatic Generation of Text Descriptive Comments for Code Blocks", The Thirty-Second AAAI Conference on Artificial Intelligence (AAAI-18), 2018, pp. 5229-5236.

Matskevich et al., "Generating Comments From Source Code with CCGs", arXiv:1810.06599v1 [cs.SE], Oct. 15, 2018, NL4SE '18, Nov. 4, 2018, Lake Buena Vista, FL, USA, 4 pages.

Mell et al., "The NIST Definition of Cloud Computing", Recommendations of the National Institute of Standards and Technology, Special Publication 800-145, Sep. 2011, 7 pages.

Rahman et al., "Recommending Insightful Comments for Source Code using Crowdsourced Knowledge", arXiv:1807.02278V1 [cs.SE], Jul. 6, 2018, 10 pages.

\* cited by examiner

DYNAMICALLY CREATING SOURCE CODE COMMENTS

TECHNICAL FIELD

The present invention relates generally to software development and more specifically, to dynamically creating source code comments based on a predicted reason for opening a source code file.

BACKGROUND

In any software source code, a software developer may insert inline comments. The associated software developer may be the original developer or may be a developer assigned to support and enhance the software source code after an initial release. One of the purposes of adding comments to software source code is so that, at any point in time, an individual, e.g., a software developer, software tester, software development manager, software architect, software analyst, etc., can open the source code file and can understand the logic of a selected location of the software source code based on reading the comments. In this case the comments can be written by a software developer or can be created automatically by an application that analyzes the source code.

If a sufficient level of detail of the logic of the associated software source code is not provided, then an individual examining the software source code may have a difficult time understanding the purpose of the associated software source code from the comments. Further, depending on the function of the individual reviewing the software source code, e.g., software developer, software tester, software development manager, software architect, software analyst, etc., the content of the comments may vary based on the role of the individual reviewing the software source code. For example, a software developer may be interested in fixing a defect, enhancing a feature, investigating a "bug," etc., and a software manager may be interested in determining if the required features for an upcoming release have been added. These different reviews of the software source code would be enhanced by comments targeting the intended review.

BRIEF SUMMARY

According to an embodiment of the present invention, a computer-implemented method for dynamically generating software source code comments, the computer-implemented method comprising: identifying, by one or more processors, an identity of a user reviewing a portion of software source code; retrieving, by one or more processors, data associated with a software source code module comprising the portion of the software source code; identifying, by the one or more processors, one or more skills associated with the user; predicting, by the one or more processors, a reason the user is reviewing the portion of software source code based on a first artificial intelligence (AI) analysis of the data; identifying, by the one or more processors, a navigation pattern associated with the user and the portion of software source code; generating dynamically, by the one or more processors, comments associated with the portion of software source code based on a second AI analysis based on factors comprising the identity, the one or more skills, the reason and the navigation pattern; displaying, by the one or more processors, the comments overlayed on the portion of software source code displayed to the user.

According to an embodiment of the present invention, a computer program product for dynamically generating software source code comments, the computer program product comprising: one or more non-transitory computer readable storage media and program instructions stored on the one or more non-transitory computer readable storage media, the program instructions comprising: program instructions to identify an identity of a user reviewing a portion of software source code; program instructions to retrieve data associated with a software source code module comprising the portion of the software source code; program instructions to identify one or more skills associated with the user; program instructions to predict a reason the user is reviewing the portion of software source code based on a first artificial intelligence (AI) analysis of the data; program instructions to identify a navigation pattern associated with the user and the portion of software source code; program instructions to dynamically generate comments associated with the portion of software source code based on a second AI analysis based on factors comprising the identity, the one or more skills, the reason and the navigation pattern; program instructions to display the comments overlayed on the portion of software source code displayed to the user.

According to an embodiment of the present invention, a computer system for dynamically generating software source code comments, the computer system comprising: one or more computer processors; one or more non-transitory computer readable storage media; and program instructions stored on the one or more non-transitory computer readable storage media, the program instructions comprising: program instructions to identify an identity of a user reviewing a portion of software source code; program instructions to retrieve data associated with a software source code module comprising the portion of the software source code; program instructions to identify one or more skills associated with the user; program instructions to predict a reason the user is reviewing the portion of software source code based on a first artificial intelligence (AI) analysis of the data; program instructions to identify a navigation pattern associated with the user and the portion of software source code; program instructions to dynamically generate comments associated with the portion of software source code based on a second AI analysis based on factors comprising the identity, the one or more skills, the reason and the navigation pattern; program instructions to display the comments overlayed on the portion of software source code displayed to the user.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of generating software source code comments based on a contextual analysis. It should be noted that although examples of specific programming languages may be depicted, embodiments described herein are applicable to any software development language.

Embodiments of the present invention can, based on contextual analysis, employ an AI enabled system to predict the reason for opening a software source code file, an identity of an individual opening the software source code file, e.g., a software developer, a software tester, a software development manager, software architect, software analyst, etc., and their respective level of software source code knowledge, e.g., technical knowledge, functional knowledge, project knowledge, etc. Accordingly relevant comments can dynamically be created in a selected section of the software source code, so a reviewing individual can understand the software source code as it relates to their role.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
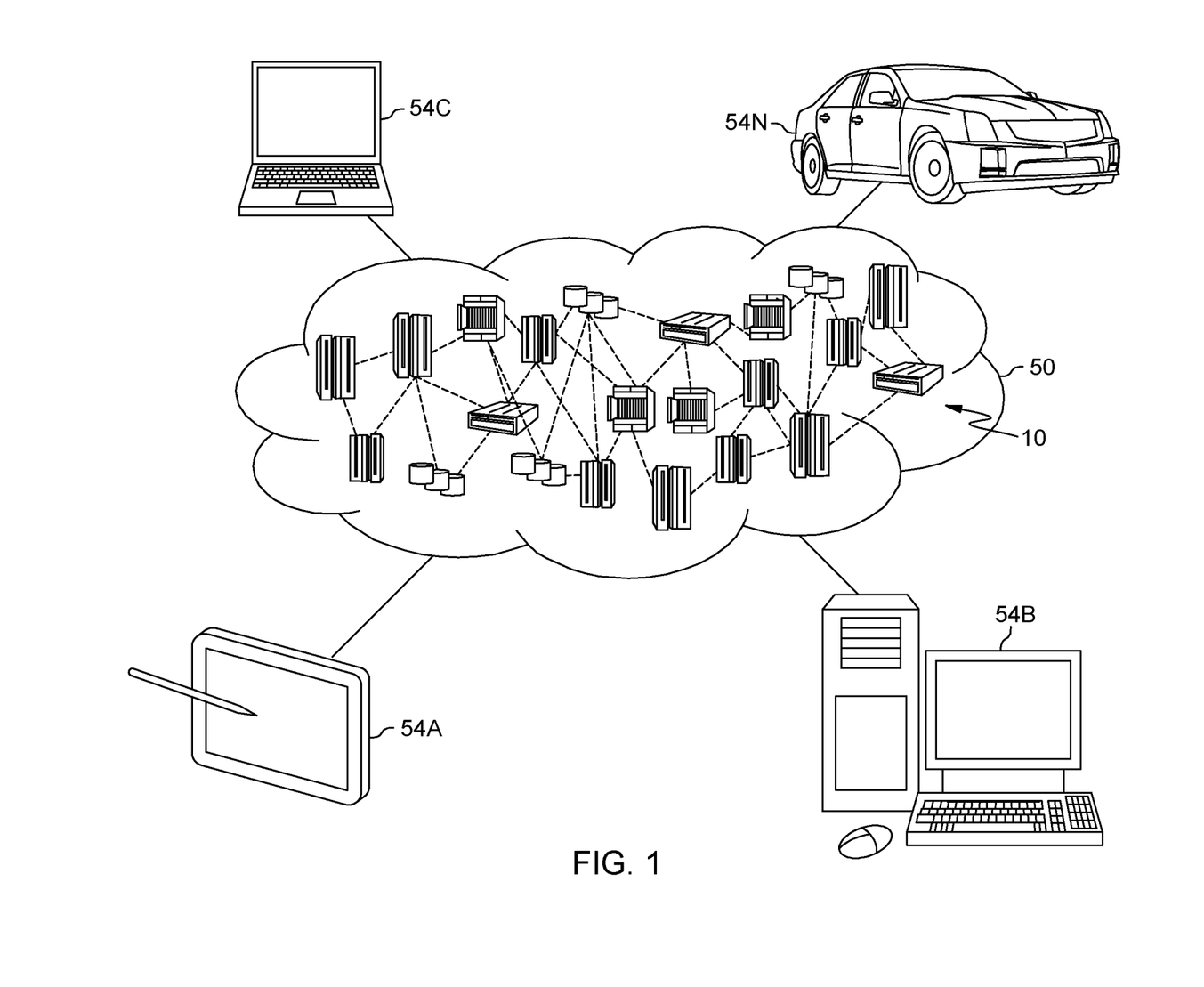
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
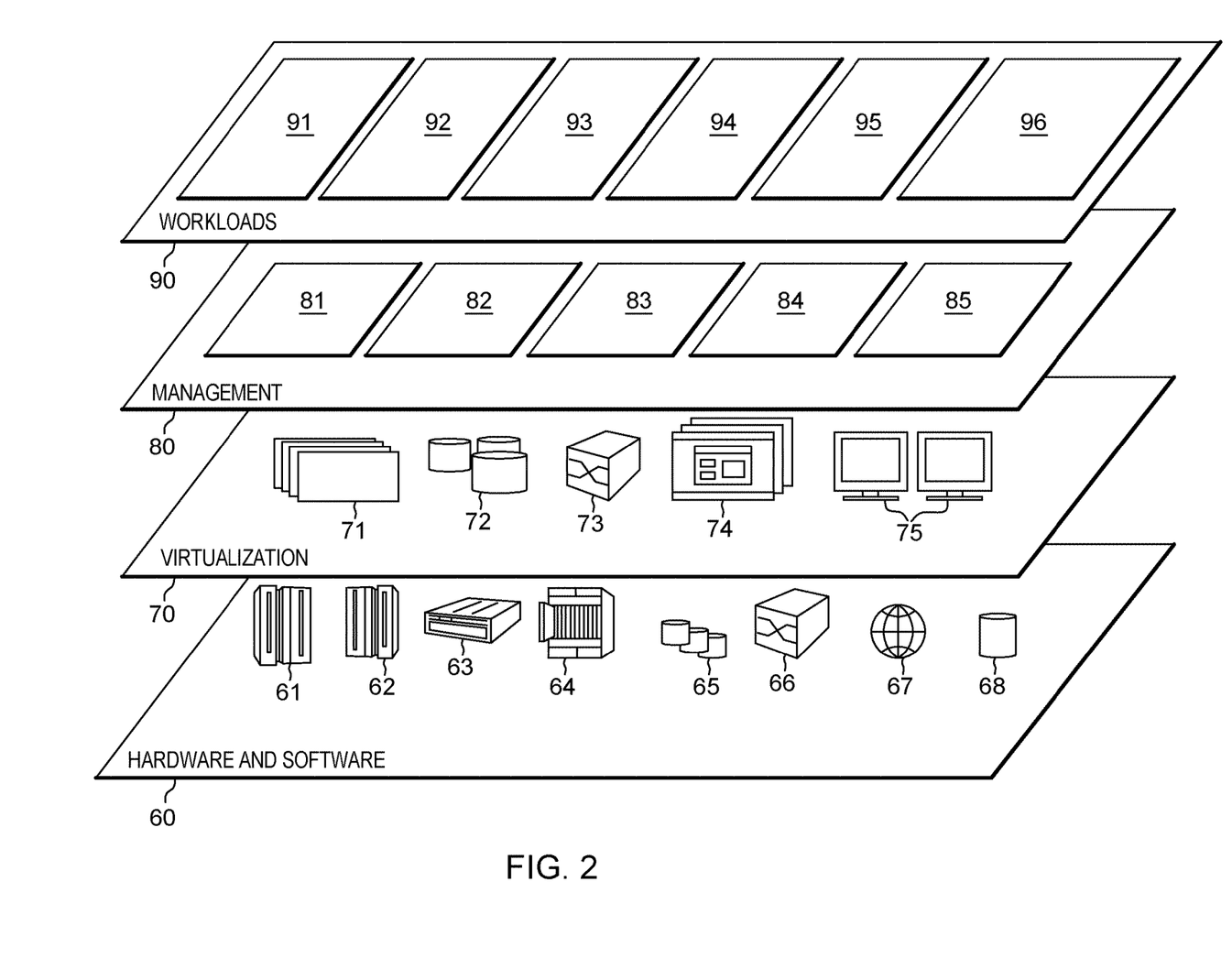
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and source code annotation management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
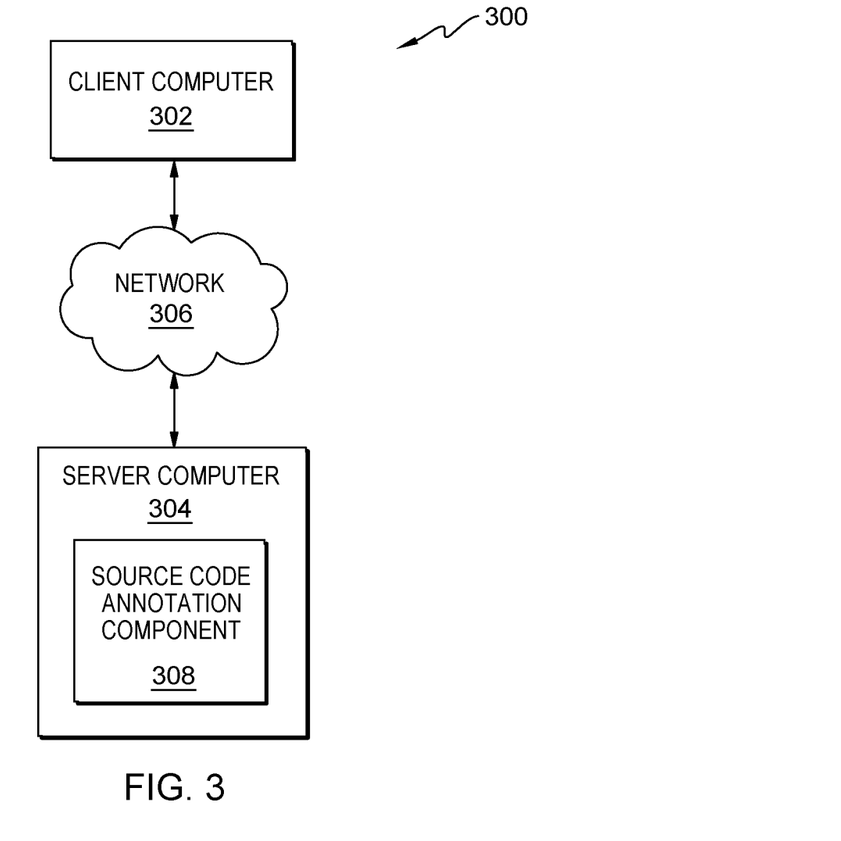
FIG. 3 is a high-level architecture, according to embodiments of the present invention.
Figure 4:
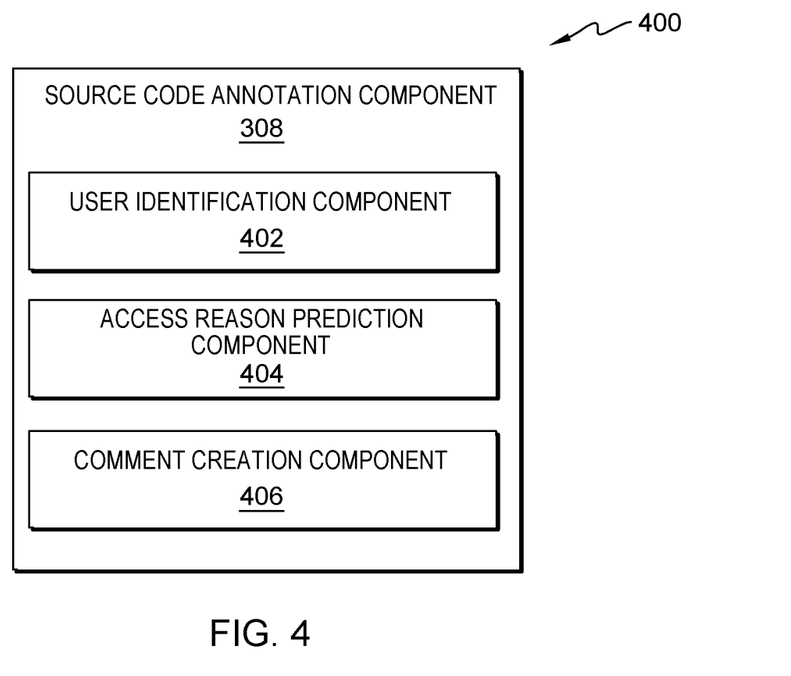
FIG. 4 is an exemplary detailed architecture, according to embodiments of the present invention.
Figure 5:
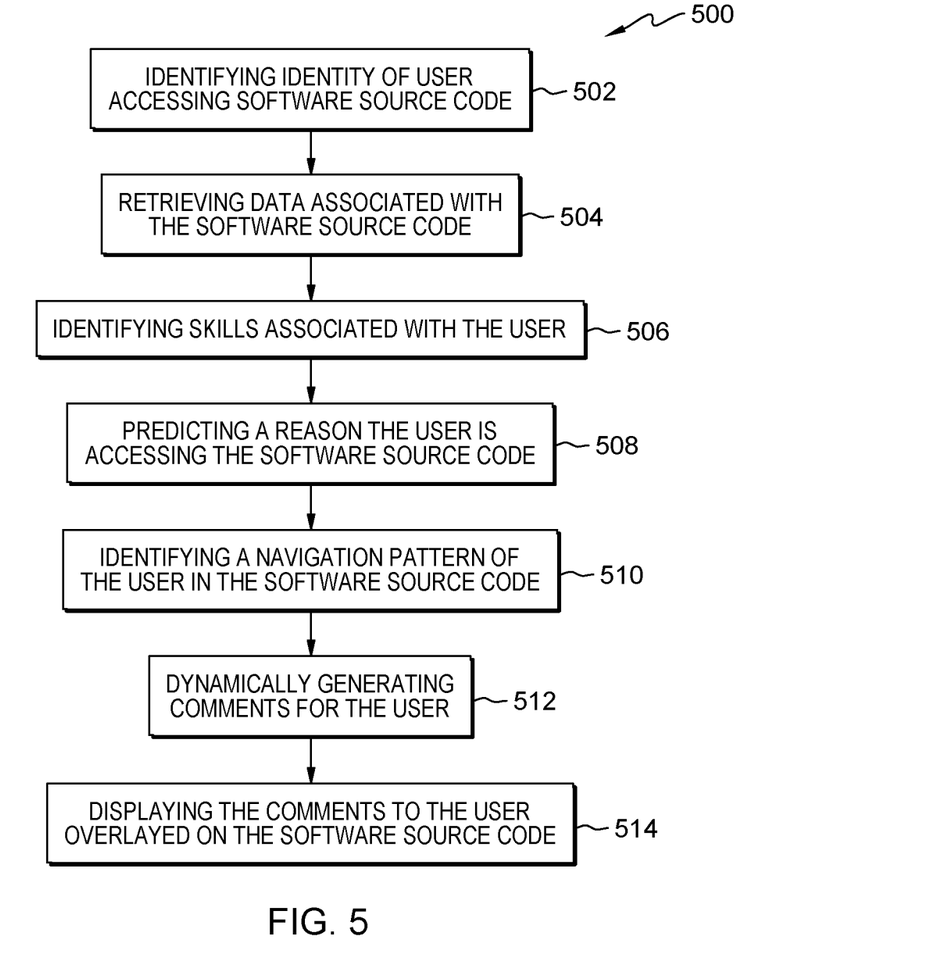
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a security optimization system, to which the invention principles may be applied. The architecture 300 comprises a client computer 302, a source code annotation component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, source code annotation component 308, operational on server computer 304, can dynamically create comments relevant to the user opening the software source code for the selected section of software source code under review. In another aspect, source code annotation component 308, can base the created comments on a contextual analysis using artificial intelligence wherein a prediction is made for the basis of reviewing the selected software source code. In another aspect of an embodiment, source code annotation component 308, can base the prediction on factors such as, but not limited to, the identity of the individual reviewing the software, e.g., software developer, software tester, software development manager, software architect, software analyst, etc., a reason for reviewing the software source code, a technical level of expertise of the individual reviewing the software source code, e.g., technical, functional, feature complete, etc. It should be noted that the predictions can be archived and associated with the software source code and the accessing individuals for use in future access.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a source code annotation component 308, which can further comprise a user identification component 402, an access reason prediction component 404 and a comment creation component 406.

In another aspect of an embodiment of the present invention, user identification component 402 can identify the user accessing the software source code. In one aspect of an embodiment, user identification component 402 can determine the user based on the machine identity accessing the software source code, e.g., an internet protocol (IP) address or a machine network name. In another aspect of an embodiment of the present invention, user identification component 402 can identify the user based on a login to an account associated with source code annotation component 308. It should be noted that user identification component 402 can identify skills and/or roles associated with the identified users, e.g., whether the identified user is a software developer, a software tester and/or a software development manager, software architect, software analyst, etc. It should further be noted that user identification component 402 can also identify a knowledge level of the identified user, e.g., technical knowledge, functional knowledge, sales/marketing knowledge, etc.

Access reason prediction component 404 can provide an AI enabled system to analyze various sources of information to predict the reason a user is opening a software source code module. For example, a reason can include but is not limited to, application feature addition, application feature enhancement, application feature removal, application feature correction, application feature testing, application feature completeness, and application applicability for proposed purpose. In another aspect, access reason prediction component 404 can, based on the predicted reason, create appropriate comments, associated with the selected source code, for display to the user. It should be noted that the created comments can be stored in an archive for later retrieval. It should also be noted that manually entered comments can also be added to the archive by the user.

In another aspect of an embodiment of the present invention, access reason prediction component 404 can organize the automatically and/or manually created comments (hereinafter comments) based on criterion such as, but not limited to, persona, code block analysis, code outcome, feature/functionality, application programming interface (API)/function documentation, serviceability messages, logging, etc. Based on access reason prediction component 404 maintaining the comments in an archive rather than the software source code, access reason prediction component 404 can avoid multiple comments, from different perspectives, covering the same software source code and keep source code files clean to avoid confusion, i.e., only the comments associated with the user viewing the software source code are displayed, appearing to be the only comments in the software source code. It should be noted that comments from other perspectives, e.g., users, roles, etc., can be manually included in the view.

In another aspect of an embodiment of the present invention, access reason prediction component 404 can maintain metadata information along with code comment blocks associated with annotations to create relationship maps and to trace software source code or create pseudo code blocks or workflows in various contexts and/or for different users. When opening any software source code, access reason prediction component 404 can predict an activity, e.g., software source code enhancement, bug fixing, functionality removal, etc. to be performed on the software source code.

Access reason prediction component 404 can receive one or more files of server log analysis, ticket analysis, user deviation between functional and non-functional parameter analysis, etc. Accordingly, access reason prediction component 404 can predict the reason of opening software source code associated with the analyzed data. In another aspect of an embodiment of the present invention, access reason prediction component 404 can analyze requirement specifications, historical knowledge corpus related to different types of comments in different software source code, user's action on the software source code etc., and construct comments through comment creation component 406 (described subsequently) to dynamically generate comments for any portion of selected software source code.

In another aspect of an embodiment of the present invention, access reason prediction component 404 can predict a navigation direction of opened software source code, amount of time spent in different portions of the software source code, and accordingly access reason prediction component 404 can dynamically create software source code comments for display to the accessing user by comment creation component 406 (described subsequently).

It should be noted that access reason prediction component 404 can also extend the functionality of a source code management system by providing a new way of navigation in a software source code repository based on a lookup of specific annotations created by access reason prediction component 404, setting a specific context and learning an identity of a person using a user role in a software source code management system. It should be noted that optionally, a user can also be explicitly set for navigating in a software source code repository.

In another aspect of an embodiment of the present invention, access reason prediction component 404 can lookup software source code and an associated visual representation using created annotations wherein all relative software source code flow will be visible alongside pseudo code, which can explain the software source code flow in a nature language.

It should be noted that access reason prediction component 404 can enable users, based on their persona, to annotate source with predefined annotations and later each of those users can review the auto-generated comments and, if desired, the user can edit the auto-generated comments. Upon user edit, access reason prediction component 404 can take the edit change(s) adapt to a user's persona and use these changes for improvement in future software source code comment generation.

For example, access reason prediction component 404 can, based on historical data related to different types of actions, identify the types of actions performed on the software source code. Access reason prediction component 404 can receive server logs, application logs, application maintenance tickets, application user's comments, requirement documents, etc. and accordingly, can identify if the application needs support, i.e., accessing for maintenance. Access reason prediction component 404 can collect and consider non-functional parameters of the applications such as, but not limited to, number of concurrent users, performance problems, customer feedback, etc. In another aspect, access reason prediction component 404 can also receive new requirements and change requests.

In another aspect of an embodiment of the present invention, access reason prediction component 404 can analyze the received data and map the data to an appropriate software source code module. For example, if access reason prediction component 404 can identify a new requirement, then the purpose of opening the software source code module is for enhancing the software source code and the persona can be a software developer. In another example, if access reason prediction component 404 can identify a problem in the received data, then the purpose of opening the software source code module is based on a defect in the software source code and the persona can be a software tester. It should be noted that in certain cases the received data can indicate more than one persona, e.g., the defect identification above may indicate either a software tester to verify the problem or a software developer to fix the problem. According, a further analysis may be required to distinguish between the two personas and identify the historical role in different areas.

In another aspect of an embodiment of the present invention, access reason prediction component 404 can identify a set of skills associated with the user accessing the software source code module based on the different types of activities performed in the software source code. It should be noted that the set of skills can include, but are not limited to, knowledge skills, functional skills, technical skills, etc. Accordingly, access reason prediction component 404 can predict the purpose of opening the software source code module, the role of the user opening the software source code module, the skills of the user opening the software source code module and the types of activities that will be performed on the software source code module. It should be noted that activities performed on the software source code can include, but are not limited to, enhancing the software source code, e.g., improving performance, correcting the software source code, e.g., fixing a "bug," adding new functionality, determining a need for re-architecting the software source code, etc.

In another aspect of an embodiment of the present invention, access reason prediction component 404 can provide for sharing annotations across teams and based on context and persona type, the annotations can be auto expanded or expanded based on clicking on the shared annotation to show more information. For example, 'XYZ' type annotation can be shared with multiple people in an email such that on the recipient side the annotation will be auto expanded based on the role/persona of the recipient. If the recipient is a software developer, then the software developer will see a software source code comments explaining the software source code from a software developer's perspective of the displayed software source code, e.g., why it was written, how it functions, etc. Whereas if, for example, a software sales/marketing user is opening the email then the annotation will be expanded to more of workflow explaining the business service function aspect of the software source code.

Comment creation component 406 can generate comments specific to the user opening the software source code module based on the AI analysis performed by access reason prediction component 404. It should be noted that a software source code module can be a software source code file or any portion thereof. The comments can be generated each time a user opens a software source code module, or the comments can be retrieved from a software source code comment archive (not shown) associated with the software source code module. It should be noted that the comments are not stored in the software source code module to minimize the complexity and volume of comments associated with the software source code module but when displayed to the user the comments appear to be embedded in the software source code module.

In another aspect of an embodiment of the present invention, comment creation component 406 can gather different types of comments associated with the software source code. In one example, comment creation component 406 can analyze requirement specifications and map the requirement specifications to the software source code, creating comments based on the requirement specifications. In another aspect of an embodiment of the present invention, comment creation component 406 can use a historical knowledge corpus to identify the detail of various comments and the associated software source code under review, associated portions of the software source code under review and searches performed while a user is performing any action on the applicable software source code.

In another aspect of an embodiment of the present invention, comment creation component 406 can identify the selected portion of the software source code under review, the user opening the software source code and the navigation pattern of the user in the software source code under review. It should be noted that the navigation pattern includes but is not limited to, the speed of the navigation, the amount of time spent in the selected portions of the software source code, etc. Comment creation component 406 can dynamically identify the portion of the source code under review based on the previously described parameters and generate comments for display, applicable to the identified user, as the user navigates the software source code. It should be noted that comment creation component 406 can update the source code comment archive with the additional information related to the navigation for the reviewing user.

FIG. 5 is an exemplary flowchart of a method 500 for dynamically generating comments for software source code. At step 502, an embodiment can identify, via user identification component 402, an identity of a user accessing software source code. At step 504, the embodiment can retrieve, via access reason prediction component 404, data associated with the software source code. At step 506, the embodiment can identify, via access reason prediction component 404, skills associated with the user. At step 508, the embodiment can predict, via access reason prediction component 404, the reason the user is accessing the software source code. At step 510, the embodiment can identify, via access reason prediction component 404, navigation patterns of the user in the software source code. At step 512, the embodiment can, via comment creation component 406, dynamically generate comments for the user. At step 514, the embodiment can display, via comment creation component 406, the comments, to the user, overlayed on the software source code.

Figure 6:
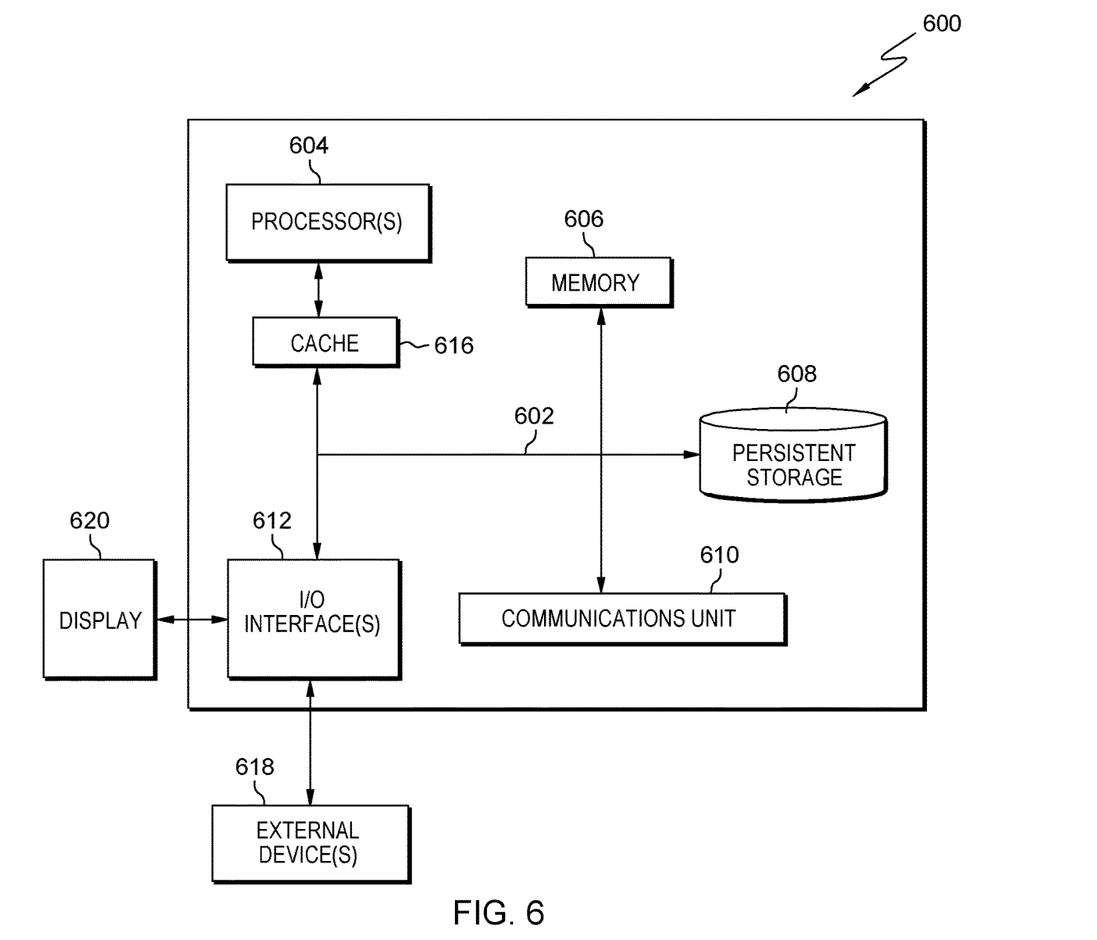
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O inter-face(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically generating software source code comments, the computer-implemented method comprising:
    identifying, by one or more processors, an identity of a user reviewing a portion of software source code;
    retrieving, by one or more processors, data associated with a software source code module comprising the portion of the software source code;
    identifying, by the one or more processors, one or more skills associated with the user;
    predicting, by the one or more processors, a reason the user is reviewing the portion of software source code based on a first artificial intelligence (AI) analysis of the data;
    identifying, by the one or more processors, a navigation pattern associated with the user and the portion of software source code;
    generating dynamically, by the one or more processors, comments associated with the portion of software source code based on a second AI analysis based on factors comprising the identity, the one or more skills, the reason and the navigation pattern; and
    displaying, by the one or more processors, the comments overlayed on the portion of software source code displayed to the user.

2. The computer-implemented method of claim 1, wherein the identity of the user comprises a software developer, a software tester, a software development manager, a software architect, and a software analyst.

3. The computer-implemented method of claim 1, wherein the data comprises one or more application logs, one or more server logs, one or more application maintenance tickets and one or more requirement documents.

4. The computer-implemented method of claim 1, wherein the reason comprises application feature addition, application feature enhancement, application feature removal, application feature correction, application feature testing, application feature completeness, and application applicability for proposed purpose.

5. The computer-implemented method of claim 1, wherein the navigation pattern comprises speed of the navigation and amount of time spent in the portion of software source code.

6. The computer-implemented method of claim 1, wherein the identity, the reason and the one or more skills are stored as metadata associated with the comments in a software source code comment archive along with the comments.

7. The computer-implemented method of claim 1, wherein the comments can be shared by different users of similar identity.

8. A computer program product for dynamically generating software source code comments, the computer program product comprising:
    one or more non-transitory computer readable storage media and program instructions stored on the one or more non-transitory computer readable storage media, the program instructions comprising:
      program instructions to identify an identity of a user reviewing a portion of software source code;
      program instructions to retrieve data associated with a software source code module comprising the portion of the software source code;
      program instructions to identify one or more skills associated with the user;
      program instructions to predict a reason the user is reviewing the portion of software source code based on a first artificial intelligence (AI) analysis of the data;
      program instructions to identify a navigation pattern associated with the user and the portion of software source code;
      program instructions to dynamically generate comments associated with the portion of software source code based on a second AI analysis based on factors comprising the identity, the one or more skills, the reason and the navigation pattern; and
      program instructions to display the comments overlayed on the portion of software source code displayed to the user.

9. The computer program product of claim 8, wherein the identity of the user comprises a software developer, a software tester, a software development manager, a software architect, and a software analyst.

10. The computer program product of claim 8, wherein the data comprises one or more application logs, one or more server logs, one or more application maintenance tickets and one or more requirement documents.

11. The computer program product of claim 8, wherein the reason comprises application feature addition, application feature enhancement, application feature removal, application feature correction, application feature testing, application feature completeness, and application applicability for proposed purpose.

12. The computer program product of claim 8, wherein the navigation pattern comprises speed of the navigation and amount of time spent in the portion of software source code.

13. The computer program product of claim 8, wherein the identity, the reason and the one or more skills are stored as metadata associated with the comments in a software source code comment archive along with the comments.

14. The computer program product of claim 8, wherein the comments can be shared by different users of similar identity.

15. A computer system for dynamically generating software source code comments, the computer system comprising:
- one or more computer processors;
- one or more non-transitory computer readable storage media; and
- program instructions stored on the one or more non-transitory computer readable storage media, the program instructions comprising:
  - program instructions to identify an identity of a user reviewing a portion of software source code;
  - program instructions to retrieve data associated with a software source code module comprising the portion of the software source code;
  - program instructions to identify one or more skills associated with the user;
  - program instructions to predict a reason the user is reviewing the portion of software source code based on a first artificial intelligence (AI) analysis of the data;
  - program instructions to identify a navigation pattern associated with the user and the portion of software source code;
  - program instructions to dynamically generate comments associated with the portion of software source code based on a second AI analysis based on factors comprising the identity, the one or more skills, the reason and the navigation pattern; and
  - program instructions to display the comments overlayed on the portion of software source code displayed to the user.

16. The computer system of claim 15, wherein the identity of the user comprises a software developer, a software tester, a software development manager, a software architect, and a software analyst.

17. The computer system of claim 15, wherein the data comprises one or more application logs, one or more server logs, one or more application maintenance tickets and one or more requirement documents.

18. The computer system of claim 15, wherein the reason comprises application feature addition, application feature enhancement, application feature removal, application feature correction, application feature testing, application feature completeness, and application applicability for proposed purpose.

19. The computer system of claim 15, wherein the navigation pattern comprises speed of the navigation and amount of time spent in the portion of software source code.

20. The computer system of claim 15, wherein the identity, the reason and the one or more skills are stored as metadata associated with the comments in a software source code comment archive along with the comments and the comments can be shared by different users of similar identity.

* * * * *